US009862146B2

(12) United States Patent
Driessen et al.

(10) Patent No.: US 9,862,146 B2
(45) Date of Patent: Jan. 9, 2018

(54) SUBSTRATE-BASED ADDITIVE FABRICATION PROCESS AND APPARATUS

(75) Inventors: Marco Marcus Matheus Driessen, Maasbracht (NL); Michelle Elizabeth Seitz, Maastricht (NL); Paulus Antonius Maria Steeman, Spaubeek (NL); John Edmond Southwell, Glen Ellyn, IL (US); Jigeng Xu, Elgin, IL (US); Richard Thomas, Sleepy Hollow, IL (US); Micha Sandor Nicolaas Hubert Mulders, Geleen (NL)

(73) Assignee: DSM IP ASSETS B.V., Heerlen (NL)

( * ) Notice: Subject to any disclaimer, the term of this patent is extended or adjusted under 35 U.S.C. 154(b) by 910 days.

(21) Appl. No.: 14/126,675

(22) PCT Filed: Jun. 15, 2012

(86) PCT No.: PCT/US2012/042587
§ 371 (c)(1),
(2), (4) Date: Aug. 21, 2014

(87) PCT Pub. No.: WO2012/174332
PCT Pub. Date: Dec. 20, 2012

(65) Prior Publication Data
US 2014/0353878 A1  Dec. 4, 2014

Related U.S. Application Data

(60) Provisional application No. 61/497,225, filed on Jun. 15, 2011.

(51) Int. Cl.
*B29C 67/00* (2017.01)
*B33Y 10/00* (2015.01)
*B33Y 30/00* (2015.01)

(52) U.S. Cl.
CPC ........ *B29C 67/0055* (2013.01); *B29C 67/007* (2013.01); *B29C 67/0066* (2013.01);
(Continued)

(58) Field of Classification Search
CPC ............ B29C 67/0051; B29C 67/0081; B29C 67/0062; B29C 67/007; B29C 67/0092;
(Continued)

(56) References Cited

U.S. PATENT DOCUMENTS 5,637,169 A * 6/1997 Hull .................... B29C 67/0062
156/155
2008/0171284 A1  7/2008 Hull et al.
2008/0174050 A1  7/2008 Kikuchi

FOREIGN PATENT DOCUMENTS

WO  WO 2010/074566  6/2010

OTHER PUBLICATIONS

International Search Report for PCT/US2012/042587, dated Oct. 17, 2012.

* cited by examiner

*Primary Examiner* — Stella Yi
(74) *Attorney, Agent, or Firm* — Daniel S. Bujas

(57) ABSTRACT

A method and apparatus for additive fabrication which provides a substrate which helps the newly hardened resin layer to separate from the substrate while providing a substrate of appropriate strength and durability. In an embodiment, the substrate is a multi-layer substrate comprising a transport layer and a structural layer, the transport layer comprising a polyolefin or a fluoropolymer, and the structural layer comprising a semi-crystal line thermoplastic polymer.

19 Claims, 4 Drawing Sheets

(52) U.S. Cl.
CPC .......... *B29C 67/0092* (2013.01); *B33Y 10/00* (2014.12); *B33Y 30/00* (2014.12)

(58) Field of Classification Search
CPC .. B29C 67/0077; B29C 67/0074; B33Y 10/00
See application file for complete search history.

SUBSTRATE-BASED ADDITIVE FABRICATION PROCESS AND APPARATUS

CROSS-REFERENCE TO RELATED PATENT APPLICATIONS

This application is the U.S. national phase of International Application No. PCT/US2012/042587, filed 15 Jun. 2012, which designated the U.S. and claims the benefit of U.S. Provisional No. 61/497,225, filed 15 Jun. 2011, the entire contents of each of which are hereby incorporated by reference.

FIELD OF THE INVENTION

The present invention relates to a substrate-based additive fabrication process and an apparatus therefore.

BACKGROUND OF THE INVENTION

Additive fabrication processes utilize computer-aided design (CAD) data of an object to build three-dimensional parts layer-by-layer. These three-dimensional parts may be formed from resins, powders, or other materials. Additive fabrication processes for producing three dimensional articles are known in the field.

An example of an additive fabrication process is stereolithography (SL). SL is a well-known process for rapidly producing models, prototypes, patterns, and production parts in certain applications. SL uses CAD data of an object wherein the data is transformed into thin cross-sections of a three-dimensional object. The data is loaded into a computer which controls a laser beam that traces the pattern of a cross section through a radiation curable resin composition contained in a vat, solidifying a thin layer of the resin corresponding to the cross section. The solidified layer is recoated with resin and the laser beam traces another cross section to harden another layer of resin on top of the previous layer. Optionally, the machine must dwell between the recoating step and the tracing of the next cross section to allow the radiation curable resin to equilibrate. The process is repeated layer by layer until the three-dimensional object is completed. When initially formed, the three-dimensional object is, in general, not fully cured and therefore may be subjected to post-curing, if required.

SL is a vat-based additive fabrication process. Vat-based systems consist of a large reservoir, or vat, of radiation curable resin wherein the imaging occurs. A vertically movable elevator platform is submersed in the vat and is used for supporting the solid three-dimensional object as it is built. The speed of the vat-based additive fabrication process is inhibited by, for instance, the recoating process and optional dwell time that must occur between building each layer of the three-dimensional object.

Additive fabrication systems have been developed wherein the imaging occurs using a vat-based system that is modified to use a foil or film to aid in forming each layer. Such a technique is disclosed in, for example, U.S. Pat. Nos. 5,171,490, 7,052,263, and 7,438,846.

Further additive fabrication systems have been developed that are known as vat-less systems. Vat-less systems differ from traditional vat-based systems in that the imaging step does not occur within the reservoir of radiation curable resin. Instead, the layer of radiation curable resin is transported to the imaging area one layer at a time. Examples of vat-less systems are disclosed in, for example, European Patent EP1710625 and U.S. Pat. Nos. 6,547,552, 7,614,866, 7,758, 799, and 7,731,887. An example of a commercially available vat-less system is the V-FLASH® system available from 3D Systems, Inc. Some of these machines employ an upside down build platform wherein the part is translated vertically upwards as it is built rather than vertically downwards as in a traditional vat-based apparatus.

Systems that require a step of separating the just cured solid layer from a separating layer or carrier such as a film, foil, glass, or plate are referred to throughout this application as substrate-based additive fabrication processes. Such separating layers and carriers will be collectively referred to as substrates throughout this application.

Substrate-based processes commonly follow the same general method of coating a layer of radiation curable resin on a substrate, contacting the layer of radiation curable resin with a previously cured layer, exposing the radiation curable resin to actinic radiation thereby forming a cured layer which adheres to the previously cured layer, separating the cured layer and the substrate, and repeating the steps a sufficient number of times in order to build up a three-dimensional object.

Although the use of substrates in an additive fabrication process provides several improvements over traditional vat-based systems, the use of substrates also presents several challenges. For instance, the substrate-based process introduces the complexity of accurately and sufficiently coating the substrate with radiation curable resin. Insufficient or uneven coating or dewetting of the radiation curable resin from the substrate can negatively impact the building of a three-dimensional object in a substrate-based process. Furthermore, the increased speed of the process requires that proper green strength is developed in the freshly cured layer of resin in order to facilitate proper peeling of the freshly cured layer from the substrate and proper bonding to the previously cured layer.

Adhesion of the curing radiation curable resin to the substrate must be managed. A freshly cured layer of radiation curable resin develops both cohesive strength to the previously cured layer and adhesive strength to the substrate as the layer solidifies. It is critical that the freshly cured layer of radiation curable resin fully peels off of the substrate. The peeling off of a freshly cured layer of radiation curable resin from the substrate is known as adhesive failure.

The adhering of a freshly cured layer to the previously solidified layer is known as cohesive strength. Developing good cohesive strength to the previously cured layer is important for all additive fabrication applications. However, cohesive strength is greatly more important in substrate-based additive fabrication processes over additive fabrication processes that do not utilize a substrate because of the added forces caused by the separating of the substrate and the freshly cured layer of radiation curable resin. Cohesive failure occurs when the freshly cured layer of radiation curable resin adheres more to the substrate than to the previously cured layer and either does not fully separate from the substrate or causes some separation among the previously cured layers. In summary, the build will fail unless adhesive failure at the curing layer/substrate interface occurs before cohesive failure for each and every layer of the build.

It is well known in the field of radiation curable resins that hybrid radiation curable resins produce cured three-dimensional articles with the most desirable mechanical properties. A hybrid radiation curable resin is a radiation curable resin that comprises both free radical and cationic polymerizable components and photoinitiators. Generally, the rate of cationic polymerization in a radiation curable resin is considered too slow for additive fabrication applications unless a sufficient amount of free-radically polymerizable components are incorporated into the radiation curable resin. The rate of photoinitiated free-radical polymerization is very fast, much faster than the rate of photoinitiated cationic polymerization. Consequently, the mechanical properties of the cured three-dimensional article develop over time after the initial cure of the hybrid radiation curable resin. Additionally, hybrid radiation curable resins present challenges due to the slower rate of cure relative to radiation curable resins that are made of only free-radically polymerizable components, such as increased adhesion to the substrate. Perhaps consequently, the use of hybrid radiation curable resins in substrate-based additive fabrication processes is not well known. Hybrid radiation curable resin formulations have been preferred in additive fabrication applications that do not use a substrate.

Free-radically polymerizable components generally develop less adhesive strength to the substrate than cationically curable components. Perhaps consequently, commercial attempts at formulating liquid radiation curable resins for use in substrate-based additive fabrication processes have generally resulted in entirely free-radically based compositions. Such compositions generally contain a mixture of various (meth)acrylates and/or urethane(meth)acrylates. See U.S. Pat. No. 7,358,283 and WO2010/027931, both to 3D Systems, Inc, Urethane(meth)acrylates are widely known to be mostly incompatible with cationically cured systems. Please see Vabrik et al., "A Study of Epoxy Resin—Acrylated Polyurethane Semi-Interpenetrating Polymer Networks," Journal of Applied Polymer Science, Vol. 68, 111-119 (1998).

Hybrid cure radiation curable resins have an increased adhesive strength to the substrate than do radiation curable resins composed of entirely free-radically curable components. Hybrid cure liquid radiation curable resins useful in a substrate based additive fabrication process and a process for substrate based additive fabrication are disclosed in, for example, PCT/US2010/60722, which is hereby incorporated by reference in its entirety.

In order to facilitate desirable peeling performance, many additive fabrication processes have utilized flexible substrates. By flexible, it is meant that the substrates are not rigid, such that the substrates can, for instance, be transported on a roll rather than in flat sheets. Flexible substrates may be elastic, as in U.S. Pat. No. 7,438,846, or substantially inelastic, as in U.S. Pat. No. 7,731,887, Specifically, flexible substrates are desirable in a wide variety of substrate-based additive fabrication processes.

Various types of flexible substrates that are useable in substrate-based additive fabrication processes are known in the art. For example, U.S. Pat. No. 5,171,490 to Fudim discusses a substrate-based additive fabrication process. Fudim prefers a fluorinated ethylene propylene copolymer. U.S. Pat. No. 5,447,822 to 3D Systems, Inc. discusses a similar device and mentions that substrates made of Teflon®, MYLAR, or epoxy are acceptable as long as they are UV-transparent and can have appropriate thickness.

U.S. Pat. No. 5,637,169 to 3D Systems, Inc. discusses an apparatus where a reactive resin is contained between a supporting and a protective sheet. This patent mentions a supporting sheet made of polyester and a protective sheet made of polyethylene or Teflon®.

Other publications that discuss the use of flexible substrates are US20060249884 to 3D Systems, Inc. which mentions polypropylene, polycarbonate, or polyethylene as possible substrate materials. U.S. Pat. No. 7,614,866 to 3D Systems, Inc. discusses substrates made of fluoropolymer resins, poly(propylene), poly(carbonate), fluorinated ethylene propylene, and mixtures and copolymers thereof. Polytetrafluoroethylene (PTFE) films are also mentioned as being useful.

WO2010/74566 to TNO discusses the use of silicone (applied as a coating to a foil of a different material) and TPX. KR10-06414 to Carima discusses the use of a modeling sheet, being glass or acryl, that may be coated with one or more of Teflon®, nylon, transparent fiber, and polyester to allow for easy separation of the modeling sheet.

As demonstrated above, various flexible substrates are known. However, the various known flexible substrates are not able to meet the various challenges of the advancements in substrate-based additive fabrication technologies. A flexible substrate that can better withstand the rigors of advanced substrate-based additive fabrication process would thus be highly desirable.

SUMMARY OF THE INVENTION

The first aspect of the instant claimed invention is a process for additive fabrication comprising:
(1) providing a flexible multi-layer substrate comprising a transport layer and a structural layer, the transport layer comprising a polyolefin or a fluoropolymer, and the structural layer comprising a semi-crystalline thermoplastic polymer;
(2) coating a layer of radiation curable resin on the transport layer of the flexible multi-layer substrate;
(3) contacting the layer of radiation curable resin with a previously cured layer;
(4) exposing the layer of radiation curable resin to actinic radiation, provided by a source of actinic radiation, thereby forming a cured layer which adheres to the previously cured layer;
(5) separating the cured layer and the flexible multi-layer substrate; and
(6) repeating steps 2-5 a sufficient number of times in order to build up a three-dimensional object.

The second aspect of the instant claimed invention is a process for additive fabrication comprising:
(1) coating a layer of radiation curable resin on a substrate, said substrate having a parallel direction and a transverse direction, and a surface tension of from 19.5 mN·m$^{-1}$ to 41 mN·m$^{-1}$, a specific essential work of fracture from 12 kJ/m$^2$ to 500 kJ/m$^2$ in both the parallel direction and the transverse direction, a tensile modulus at the operating temperature of the additive fabrication process above 0.2 GPa and less than 6 GPa in the parallel direction, and a yield stress above 20 MPa and less than 150 MPa in the parallel direction;
(2) contacting the layer of radiation curable resin with a previously cured layer;
(3) exposing the layer of radiation curable resin to actinic radiation, provided by a source of actinic radiation, thereby forming a cured layer which adheres to the previously cured layer;
(4) separating the cured layer and the substrate; and
(5) repeating steps 1-4 a sufficient number of times in order to build up a three-dimensional object.

The third aspect of the instant claimed invention is an apparatus for additive fabrication comprising:
(1) a flexible multi-layer substrate comprising a transport layer and a structural layer, the transport layer comprising a polyolefin or a fluoropolymer, and the structural layer comprising a semi-crystalline thermoplastic polymer;

(2) an applicator adapted to apply a layer of radiation curable resin to the transport layer of the flexible multi-layer substrate;

(3) a source of actinic radiation arranged to deliver actinic radiation to the layer of radiation curable resin through the flexible multi-layer substrate; and (4) a platform capable of supporting a three-dimensional object.

DETAILED DESCRIPTION

Figure 1:
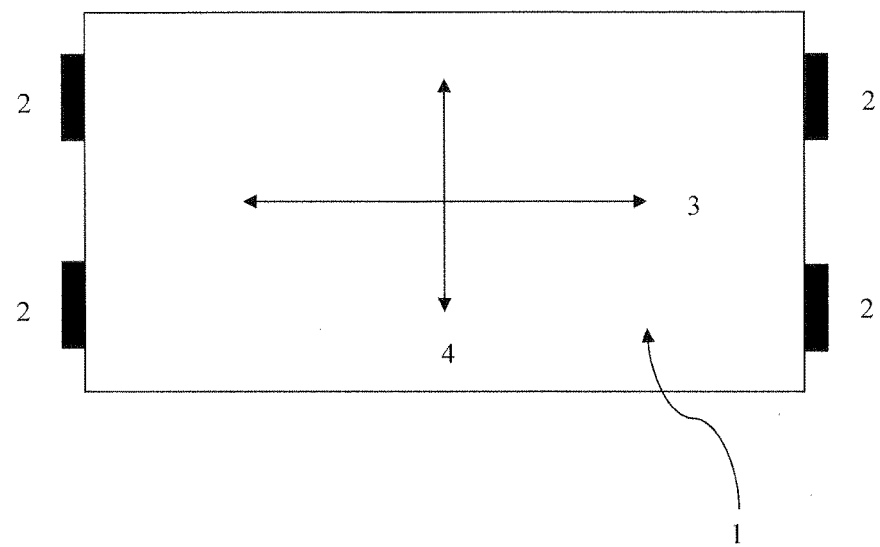
FIG. 1 is a top perspective view of a secured substrate.

Various features of some advanced substrate-based additive fabrication processes may present barriers to the use of currently known substrate designs in these advanced processes. For example, the tension maintained on the substrate in some additive fabrication processes may be overly stressful on known substrates. Moreover, temperatures as high as 30, 35, or even 45° C. may be required to promote curing of the cationic part of the radiation curable resin. These elevated temperatures may undesirably degrade, warp, or stretch known substrates. Furthermore, the repeated curing cycles of certain radiation curable resins on the substrate may further degrade known substrates, as the curing of radiation curable resins may create strong acids and radicals on the surface of the substrate. Lastly, the substrate may become embrittled or otherwise deteriorate under repeated exposure to the radiation required to cure the radiation curable resin, especially in the case when UV light is used to cure the radiation curable resin.

Each of these effects may degrade previously known substrates such that only a few layers can be built before the substrate must be replaced. Since the average additive fabrication process may require the building of thousands of layers, repeated replacement of the substrate is highly detrimental to both the costs incurred in building a three-dimensional object and the speed and reliability of the process itself.

The first aspect of the instant claimed invention is a process for additive fabrication comprising:

(1) providing a flexible multi-layer substrate comprising a transport layer and a structural layer, the transport layer comprising a polyolefin or a fluoropolymer, and the structural layer comprising a semi-crystalline thermoplastic polymer;

(2) coating a layer of radiation curable resin on the transport layer of the flexible multi-layer substrate;

(3) contacting the layer of radiation curable resin with a previously cured layer;

(4) exposing the layer of radiation curable resin to actinic radiation, provided by a source of actinic radiation, thereby forming a cured layer which adheres to the previously cured layer;

(5) separating the cured layer and the flexible multi-layer substrate; and (6) repeating steps 2-5 a sufficient number of times in order to build up a three-dimensional object.

In accordance with the first aspect of the instant claimed invention, the flexible multi-layer substrate comprises at least a transport layer and a structural layer, and is thus a multi-layer substrate. The flexible multi-layer substrate must have at least two layers. In some embodiments, the flexible multi-layer substrate has two layers, and in other embodiments three or four layers. There is no practical limit on the number of layers in the flexible multi-layer substrate as long as the substrate does not reduce the effectiveness of the additive fabrication process. For instance, in some cases the addition of too many layers may reduce the radiation transparency of the flexible multi-layer substrate to a level where insufficient actinic radiation can be delivered to the radiation curable resin.

Similarly, there is no practical limit to the thickness of the flexible multi-layer substrate as long as the thickness does not too negatively impact the building of the three-dimensional object. In an embodiment, the flexible multi-layer substrate has a thickness of at least 20 microns. In an embodiment, the flexible multi-layer substrate thickness is from about 50 microns to about 350 microns. In an embodiment, the flexible multi-layer substrate thickness is from about 20 microns to about 250 microns. In an embodiment, the flexible multi-layer substrate thickness is from about 50 microns to about 250 microns. In another embodiment, the flexible multi-layer substrate is from about 90 microns to about 160 microns in thickness.

In an embodiment, each layer of the flexible multi-layer substrate is at least 10 microns thick. In an embodiment, each layer of the flexible multi-layer substrate is at least 20 microns thick. In an embodiment, the transport layer is from 10 to 100 microns thick and the structural layer is from 10 to 250 microns thick. In an embodiment, the transport layer is from 10 to 100 microns thick and the structural layer is from 30 to 200 microns thick.

The flexible multi-layer substrate comprises a transport layer and a structural layer. The transport layer is for contacting radiation curable resin. Therefore, the transport layer should have desirable properties for contacting a radiation curable resin and possess properties that allow for desirable separation from the freshly cured layer of radiation curable resin. The structural layer provides structural integrity. For instance, the structural layer possesses some improved physical properties compared to the physical properties of the transport layer. The transport layer is thus for contacting the radiation curable resin and the structural layer is for providing structural integrity, the structural layer and transport layer being secured to one another. For instance, the transport layer may be secured directly to the structural layer or may be secured to one or more intermediate items which are secured to the structural layer.

The transport and structural layer of the flexible multi-layer substrate, and other layers if necessary, can be secured using methods well known in the art, such as coextrusion, lamination, and heat bonding. Any available method can be used to secure the layers as long as the method is compatible with the materials selected for each layer of the flexible multi-layer substrate and is capable of forming a flexible multi-layer substrate that will permit building of a three-dimensional object via an additive fabrication process. The method of securing used must achieve a flexible multi-layer substrate with substantially uniform thickness and little or no wrinkling. The flexible multi-layer substrate should have low internal stresses to avoid warping of the flexible multi-layer substrate and should be substantially flat to allow accurate building of three-dimensional objects. Lamination requires the use of an adhesive or other substance to secure the layers. Heat bonding involves heating a layer of the flexible multi-layer substrate to an appropriate temperature and then pressing it to another layer of the flexible multi-layer substrate in order to secure the layers.

The coextrusion method of forming flexible multi-layer substrates may require the use of a tie-layer. The tie-layer is a thin material that will secure the coextruded layers together. Suitable materials for the tie-layer are polyolefins grafted with maleic anhydride, such as Yparex®, or Exxelor™ from ExxonMobil®. The tie-layer should be selected to ensure adequate adhesion to prevent delamination of both layers during the additive fabrication process and does not have any significant effect on the radiation transmission properties of the assembled substrate.

For the lamination method of forming flexible multi-layer substrates, a surface treatment may be required to sufficiently secure the layers of the flexible multi-layer substrate to one another. To obtain good adhesion between the layers of the flexible multi-layer substrate, a surface treatment may be required to introduce reactive groups on the surface of a layer of the flexible multi-layer substrate in order to sufficiently secure the layers of the flexible multi-layer substrate to one another.

In an embodiment, a corona treatment or other plasma treatment is performed on a layer of the flexible multi-layer substrate before adhesion. Corona treatment is a surface modification technique that uses low temperature corona discharge plasma to impart changes in the properties of a surface. The corona plasma is generated by the application of high voltage to sharp electrode tips which forms plasma at the ends of the sharp tips. A linear array of electrodes is often used to create a curtain of corona plasma. In another embodiment, a chemical treatment is performed on a layer of the substrate before it is secured to another layer of the substrate. Surface treatment may be performed on only the bottom layer of a transport layer or on the contacting sides of the both the transport layer and the structural layer or on other various layers of the flexible multi-layer substrate.

For the lamination method of forming flexible multi-layer substrates an adhesive must be used to secure the transport layer and structural layer. The transport layer and structural layer can be secured using an adhesive that does not have any significant effect on the radiation transmission properties of the assembled flexible multi-layer substrate. Suitable adhesives for lamination are typically two component polyurethane adhesives. However this is not limited to the use of polyurethanes. Examples of other possible adhesives are maleic anhydride modified polyethylene, acrylics or two-component epoxy, both water or solvent borne, and others.

Generally, forming flexible multi-layer substrates by coating a first material onto a second material is not desired. Coating may yield a surface that is nonuniform in dimension or in consistency due to variances in the curing or drying of the coating material. Additionally, the coating may be less resistant to scrapes or scratches, and more likely to wear off over time than flexible multi-layer substrates comprising a polyolefin or fluoropolymer transport layer and a semi-crystalline thermoplastic structural layer.

Furthermore, flexible multi-layer substrates that contain a transport layer formed by a coating process have been found to be substantially less durable than multi-layer substrates comprising a polyolefin or fluoropolymer transport layer. During testing of coated substrates, it was found that a silicone layer coated on a PET structural layer was not durable, as adhesion of curing radiation curable resin to the flexible multi-layer substrate was observed after building just a few hundred layers. The coextrusion and lamination methods of securing a transport layer and structural layer have thus been found to provide a more robust flexible multi-layer substrate.

According to the first aspect of the instant claimed invention, the flexible multi-layer substrate comprises a polyolefin or fluoropolymer transport layer. The transport layer possesses properties that allow for acceptable coating of the radiation curable resin and peeling of the freshly cured layer. The transport layer must not cause any substantial dewetting of the radiation curable resin coated on the transport layer before the radiation curable resin is cured. The transport layer must not substantially adhere to the freshly cured layer such that the step of separating the freshly cured layer and the substrate does not exhibit cohesive failure. Furthermore, the use of a transport layer is able to protect the radiation curable resin from the structural layer and, depending on the structural layer, protect the structural layer from the radiation curable resin. Certain polymeric structural layers may contain significant amounts of water. The water in certain polymers that may comprise the structural layer, for instance polyamides and polyesters, may cause the strong acids generated when curing certain radiation curable resins to catalyze the hydrolysis of the substrate. By using a polyolefin or fluoropolymer transport layer in the substrate, this interaction is eliminated because the acids are unable to contact the structural layer.

In an embodiment the transport layer is a polyolefin. In other embodiments the transport layer is a branched low density polyethylene (LDPE), linear low density polyethylene (LLPE or LLDPE), high density polyethylene (HDPE), highly branched polyethylene, or ultra high molecular weight polyethylene (UHMWPE) which has a molecular weight of typically more than $1 \times 10^6$ g/mol. In further embodiments, the transport layer is a plastomer, such as copolymers of ethylene and octene, and polymethylpentene. In other embodiments, the transport layer is an ethylene, propylene, butene, hexene, octene, norbornene, styrene polymer or copolymers and blends thereof. In an embodiment, the transport layer is a, high ethylene grade of ethylene-norborene copolymer such as TOPAS.

Due to the dewetting of certain radiation curable resins, specifically hybrid cure liquid radiation curable resins, on the surface of a fluoropolymer, the radiation curable resin may have dewetted prior to curing the radiation curable resin if the additive fabrication process is too slow. Generally, polyolefins are less likely to cause resin dewetting than fluoropolymers, and are thus preferred depending on the additive fabrication process.

Fluoropolymers may also form useful transport layers depending on the process speed of the additive fabrication process. In an embodiment, the transport layer is a fluoropolymer. In certain embodiments, the transport layer is a polytetrafluoroethylene (PTFE). In other embodiments the transport layer is a copolymer of tetrafluoroethylene and ethylene (ETFE, Tefzel®). In an embodiment, the transport layer is a fluorinated ethylene propylene copolymer (Teflon® FEP). In an embodiment, the transport layer is Teflon® AF which is a copolymer of tetrafluoroethylene and 2,2-bis(trifluoromethyl)-4,5-difluoro-1,3-dioxole. In further embodiments, the transport layer is polyvinylidenefluoride (PVF), and in further embodiments polyvinylidenedifluoride (PVDF).

In an embodiment, the flexible multi-layer substrate is isotropic. Isotropicity can be achieved with unoriented or biaxially oriented substrates. In an embodiment the transport layer is unoriented. In another embodiment, the transport layer is biaxially (in the x-y plane) oriented. In a further embodiment, the structural layer is unoriented, and in an embodiment the structural layer is biaxially oriented. In an embodiment, an isotropic structural layer is formed from a plurality of oriented layers. In an embodiment the transport layer is given a matte finish by manual etching, for instance with steel wool, in order to impart a surface finish to the radiation curable resin contacting side of the transport layer.

According to the first aspect of the instant claimed invention, the flexible multi-layer substrate comprises a semi-crystalline thermoplastic structural layer. The structural layer possesses improved physical properties over the transport layer. For instance, the structural layer may provide improved tear resistance, temperature resistance, mechanical properties such as tensile modulus or yield stress, or other properties. The structural layer must also possess high radiation transparency if the additive fabrication process or apparatus is arranged to transmit actinic radiation through the substrate.

The structural layer comprises a semi-crystalline thermoplastic polymer. In embodiments, the semi-crystalline thermoplastic polymer is a polyamide. In other embodiments, the structural layer is a polyamide-6, polyamide-6,6, polyamide-4,10, polyamide-4,6, polyamide-11, polyamide-12, polyamide-6T, polyamide-4T, polylactams, or copolymers thereof. In other embodiments, the structural layer is a polyester. In further embodiments, the structural layer is a polyethyleneterephthalate, poly butyleneterephthalate, polypropyleneterephthalate, or glycolized copolymers thereof. In other embodiments, the structural layer is a polylacticacid, poly glycolic acid, polyhydroxyalkanoates, polylactones, polyethylenenapthalate (PEN), polybutylene napthalate (PBN), or copolymers thereof. In still other embodiments, the structural layer is a polyether. In further embodiments, the structural layer is a polyoxymethylene, polyalkyleneoxide, or copolymers thereof. In an embodiment, the structural layer is biaxially stretched during processing, leading to a biaxial orientation.

In other embodiments, the structural layer is a reinforced semi-crystalline thermoplastic polymer. The polymer may be reinforced by, for instance, fibers or particles. In an embodiment, the particles are mineral fillers, such as, mica, talcum, calcium carbonate, barium sulfate, etc. In another embodiment, the particles are sub-micron-sized particles for instance nanoclays and nano-silicas. The sub-micron sized particles have the advantage that they are dispersible in a way that will not substantially affect the light transmission of the substrate. When utilizing reinforced polymers, the UV transmission of the substrate must be closely monitored, and substantially radiation transparent reinforcements are preferred. In an embodiment, the structural layer comprises a polyamide nanocomposite.

Semi-crystalline thermoplastic polymer structural layers are employed over amorphous materials because semi-crystalline thermoplastic polymers are generally less brittle and have improved crack resistance over amorphous materials. Furthermore, semi-crystalline thermoplastic polymers have improved crazing resistance over amorphous polymers. Crazing may be exacerbated by UV light exposure.

In other embodiments, the flexible multi-layer substrates can also be described by various important physical properties. The inventors performed many experiments to determine which properties of the flexible multi-layer substrate were most important for the success of the additive fabrication process or apparatus. A non-exhaustive list of physical properties of the flexible multi-layer substrate that are important for the success of the additive fabrication process are the surface tension, the light transmission, the tear resistance, and the ability to be plastically deformed. Furthermore, in additive fabrication processes that use radiation curable resins with a component that has improved curability at an elevated temperature, the $T_g$ of the substrate may be important.

The surface tension of the transport layer is important to avoid radiation curable resin dewetting before imaging. Dewetting is the characteristic of the interaction between the radiation curable resin and the transport layer that describes the speed at which nonuniformity develops, for example the formation of droplets, in the layer of radiation curable resin formed on the surface of the transport layer. The allowable amount of radiation curable resin dewetting will depend on the speed of the additive fabrication process and the viscosity of the radiation curable resin. If the step of exposing the layer of radiation curable resin to actinic radiation in the additive fabrication process occurs very quickly after the step of coating the radiation curable resin on the substrate, then the allowable time until the occurrence of dewetting of the radiation curable resin on the substrate will be less than if there was a greater time difference between the steps of coating and exposing. Generally, radiation curable resin dewetting will occur faster with transport layers with lower surface tensions.

While a surface tension of the substrate that is too low is not desirable in an additive fabrication process because it may lead to unacceptable radiation curable resin dewetting, a surface tension that is too high also may negatively impact the additive fabrication process. Generally, if the surface tension is too high, the increased adhesion of the freshly cured layer to the substrate may lead to cohesive failure of the build. Consequently, the surface tension of the transport layer of the substrate should be low enough so that the adhesion of the freshly cured layer to the substrate does not exceed permissible values.

In an embodiment, the surface tension of the transport layer is at least 19.5 mN·m$^{-1}$ and at most 41 mN·m$^{-1}$ to prevent rapid resin dewetting on the lower end of the range or adhesion to the transport layer on the upper end of the range. In an embodiment, the surface tension is from 5 mN·m$^{-1}$ less than the radiation curable resin's surface tension, to an upper limit of 41 mN·m$^{-1}$. Surface tensions of many known polymers and the method for calculating surface tension can be found in A. Zosel, Colloid & Polymer Science, 263, 541 (1985), hereby incorporated by reference in its entirety as if fully set forth herein.

The flexible multi-layer substrate must also have suitable radiation transparency if the additive fabrication apparatus used to perform the additive fabrication process projects radiation through the substrate. In an embodiment where light is used to cure the radiation curable resin through the substrate, the light transmission of the substrate is important. Similarly, UV transmission is important if the additive fabrication process cures the radiation curable resin with UV light. For a given flexible multi-layer substrate, the light transmission is generally a function of the wavelength of the light. UV transmission is determined by recording the UV spectrum of the polymeric substrate on, for instance, a Perkin Elmer spectrophotometer. To avoid the effect of scattering due to surface roughness, the flexible multi-layer substrate is wetted in ethanol.

In an embodiment, the light transmission of the flexible multi-layer substrate at the peak wavelength of the light used to cure the radiation curable resin in the additive fabrication process or apparatus is greater than 80%, more preferably greater than 90%. In an embodiment, the UV transmission at the peak wavelength used to cure the radiation curable resin is greater than 80%, more preferably greater than 90%. In an embodiment, the UV transmission of the flexible multi-layer substrate over the range of 350-400 nm is greater than 80%, more preferably greater than 90%. The UV transmission is dependent on the thickness of the flexible multi-layer substrate; therefore, a thin flexible multi-layer substrate is preferred, depending on the transmission properties of the flexible multi-layer substrate. In other embodiments, the UV transmission at the peak wavelength of 365 nm, is greater than 80%, more preferably greater than 90%.

In some embodiments, the flexible multi-layer substrate is highly resistant to tearing, as demonstrated by attaining a specific essential work of fracture of greater than 12 kJ/m$^2$ in each direction of support. A direction of support is the direction along which the substrate would be stretched if two opposite supports were moved away from each other in opposite directions. By parallel direction it is meant the direction along which the substrate is secured in the additive fabrication process or apparatus. By transverse direction it is meant the direction perpendicular to the parallel direction. For instance, if a rectangular shaped substrate is secured by clamps present along the minor sides of the rectangle, the parallel direction would be the direction perpendicular to the minor sides and the transverse direction would be the direction parallel to the minor sides. In some embodiments, the flexible multi-layer substrate is secured at opposite ends and not secured at other opposite ends, thereby forming a parallel and a transverse direction. In other embodiments, the substrate is additionally secured on more than two ends of the flexible multi-layer substrate such that there is no parallel or transverse direction.

Please see FIG. 1 for a visual illustration of the direction of support, parallel direction, and transverse direction. In FIG. 1, the flexible multi-layer substrate 1 is secured by supports 2. Direction 3 represents the direction of support, which in FIG. 1 can also be called the parallel direction. Direction 4 represents the transverse direction. The multi-layer substrate in FIG. 1 only has one direction of support.

In some embodiments, the flexible multi-layer substrate has a specific essential work of fracture greater than 12 kJ/m$^2$, in both the parallel and transverse direction of the substrate and less than 500 kJ/m$^2$. In embodiments, the substrate attains a specific essential work of fracture greater than 12 kJ/m$^2$ and less than 500 kJ/m$^2$ in each direction of support. Specific essential work of fracture can be measured by a double edge notched tensile test, as detailed in the Examples of this patent application. Further information about the specific essential work of fracture ($w_e$) and specific non-essential work of fracture multiplied by the dimensionless factor β ($w_p\beta$) can be found in Maspoch et al., "The Essential Work of Fracture of a Thermoplastic Elastomer," Polymer Bulletin, 39, 246-255 (1997), which is hereby incorporated by reference in its entirety as if fully set forth herein. Depending on the additive fabrication process or apparatus, the constant tension or tension cycling on the substrate, repeated radiation exposure, and/or repeated cycles of coating, curing, and peeling radiation curable resin on the substrate may cause the tear resistance of the substrate to decrease as the number of additive fabrication process cycles performed increases.

Resistance to tearing can also be represented by attaining a sufficient specific non-essential work of fracture multiplied by the dimensionless factor β ($w_p\beta$). Specific non-essential work of fracture is associated with material yielding. In an embodiment, the substrate has a $w_p\beta$ of greater than 8 mJ/mm$^3$ in each direction of support. In an embodiment, the substrate has a $w_p\beta$ of from 8 mJ/mm$^3$ to 500 mJ/mm$^3$ in each direction of support. In further embodiments, the substrate has a $w_p\beta$ of from 8 mJ/mm$^3$ to 500 mJ/mm$^3$ and a specific essential work of fracture ($w_e$) of from 12 kJ/m$^2$ to 500 kJ/m$^2$ in each direction of support. In further embodiments, the substrate has a $w_p\beta$ of from 8 mJ/mm$^3$ to 500 mJ/mm$^3$ and a specific essential work of fracture ($w_e$) of from 12 kJ/m$^2$ to 500 kJ/m$^2$ in both the parallel and transverse direction.

In an embodiment, the flexible multi-layer substrate is not substantially plastically deformed during process cycling. The capability of elastic deformation is evidenced by a tensile modulus at the operating temperature of the additive fabrication process above 0.2 GPa and less than 6 GPa and a yield stress above 20 MPa and less than 150 MPa. Tensile tests are performed with a Zwick Z010 tensile machine provided with a Type KAF-TC 10 kN load cell and pneumatic specimen grips (type 8397.00.00 10 kN) at room temperature at a test speed of 50 mm/min. Dumbbell ISO527-2 Type5B type samples are punched out of each substrate such that the loading direction was either transverse or parallel. Both orientations are tested for all substrates.

In an embodiment, the additive fabrication process is carried out at a temperature above room temperature. In an embodiment, the additive fabrication process is carried out at from about 30° C. to 45° C. In such additive fabrication processes, a flexible multi-layer substrate with a structural layer that has a glass transition temperature ($T_g$), determined from the maximum in the peak of loss modulus (E") as derived from the DMA (dynamic mechanical analysis) procedure, of greater than the operating temperature of the additive fabrication process is required to provide the greatest level of structural integrity. In an embodiment, the $T_g$ of the structural layer of the substrate is from about 30° C. to about 200° C., preferably from 33° C. to 200° C. In another embodiment, the $T_g$ of the structural layer of the flexible multi-layer substrate is from about 30° C. to about 100° C., preferably from about 33° C. to about 100° C. In another embodiment, the $T_g$ of the structural layer of the flexible multi-layer substrate is from about 30° C. to about 65° C., preferably from about 33° C. to about 65° C. In an embodiment, the $T_g$ of the structural layer exceeds the operating temperature by at least 2° C. to compensate for the heating of the flexible multi-layer substrate due to polymerization of the radiation curable resin.

The $T_g$ can be calculated using a DMA procedure. The samples for the measurements are punched out of the substrate to be tested. The thickness is measured with a calibrated Heidenhain thickness meter. The dynamic mechanical measurements are performed in accordance with ASTM D5026 on a Rheometrics Solids Analyzer III at a frequency of 1 Hz and over a temperature area of −130° C. to 250° C. with a heating speed of 5° C./min. During the measurements, the tensile storage modulus (E'), the tensile loss modulus (E") and the loss tangent (tan δ) as function of temperature are determined. Deviation from the ASTM D5026 are: Allowed temperature deviation ±2° C. (in standard ±1° C.); Allowed force deviation ±2% (in norm standard ±1%); Allowed frequency deviation ±2% (in standard ±1%); Heating speed 5° C./min. (in standard 1 to 2° C./min.)

The second step of the first aspect of the instant claimed invention is to coat a layer of the radiation curable resin on the transport layer of the flexible multi-layer substrate. A radiation curable resin is a resin that will solidify and bond to a previously cured layer of radiation curable resin or to some other surface in response to actinic radiation. Liquid radiation curable resins are preferred. Examples of other appropriate materials that may be usefully employed in the invention are semi-solid or gel-like radiation curable materials.

Coating can be accomplished by employing, for example, a gravure roller (meyer bar), an applicator, a nozzle, or by spray-coating the flexible multi-layer substrate, depending on the nature of the radiation curable resin. Coating may be either selective, as in an ink-jet or other selective deposition process, or non-selective, as in a process which coats a uniform layer of radiation curable resin and then selectively applies radiation to cure said radiation curable resin. A thin layer of radiation curable resin is desired. In an embodiment, the layer of radiation curable resin is from 1 to 1000 microns thick. Preferably, the layer of the radiation curable resin is from about 25 micron to about 250 micron thick, more preferably from 25 micron to 125 micron, more preferably from 25 micron to 75 micron, and of substantially uniform thickness. In an embodiment, the radiation curable resin is a liquid radiation curable resin with a viscosity from 1 cps to 20,000 cps.

In an embodiment, the radiation curable resin used in the process of the invention comprises at least 30 wt %, preferably from 30 to 85 wt %, more preferably at least 35 wt %, more preferably from 35 to 80 wt %, more preferably from 35 to 75 wt % of cationically curable compounds. In another embodiment, the radiation curable resin comprises at least 40 wt %, more preferably from 40 to 80 wt %, more preferably from 40 to 75 wt %, more preferably from 40-70 wt % of cationically polymerizable compounds. In other embodiments, the radiation curable resin comprises from 30 to 85 wt %, more preferably from 35 to 80 wt %, more preferably from 35 to 75 wt % of cationically curable compounds, and from 10 to 60 wt % of free-radically curable compounds. In an embodiment, the radiation curable resin comprises from 30 to 80 wt % or 30 to 70 wt % of cationically curable compounds, and from 10 to 60 wt % of free-radically curable compounds.

The third step of the first aspect of the instant claimed invention is to contact the radiation curable resin on the transport layer of the flexible multi-layer substrate with a previously cured layer. This may be performed by, for example, moving the flexible multi-layer substrate, thus bringing into contact the radiation curable resin and the previously cured layer, or by moving the previously cured layer into contact with the radiation curable resin on the flexible multi-layer substrate. For the first layer of a three-dimensional object, the radiation curable resin may be contacted with a solid build platform such as a build pad or solid plate. It may be desirable to use a higher actinic radiation dose in order to ensure good adherence to the build platform for the initial layer of the three-dimensional article.

The fourth step of the first aspect of the instant claimed invention is to expose the radiation curable resin to actinic radiation, thereby forming a freshly cured layer which adheres to a previously cured layer. The actinic radiation may come from any suitable source, for instance a laser, lamp, LED, or laser diode. In an embodiment the exposure is selective. In another embodiment, the exposure is not selective. For photocurable radiation curable resins, any appropriate emitting wavelength of light that sufficiently overlaps with the absorbance spectrum of the photoinitiators in the radiation curable resin is suitable. Preferably the wavelength of light is from 300 to 475 nm, preferably 340 to 400 nm, more preferably 350-375 nm, more preferably about 365 nm. In an embodiment, the actinic radiation source is an LED or array of LEDs. The exposure may be selective or non-selective.

Exposure may occur by, for example, moving a source of actinic radiation over the length of the radiation curable resin and/or by switching the source of actinic radiation on and off in accordance with the desired exposure profile. In another embodiment, the actinic radiation is selectively applied by mask exposure. In a further embodiment, the actinic radiation is applied by using a projection from a DMD (digital micromirror device). In an embodiment, the actinic radiation is applied by using a micro-shutter arrangement to selectively expose the radiation curable resin to actinic radiation. In an embodiment, the actinic radiation must first pass through the substrate to reach the radiation curable resin.

In an embodiment, the exposure of the entire layer can occur in one step, for instance by using one projection, or multiple projections which occur simultaneously or in succession. In another embodiment, the exposure can occur gradually. For instance, the exposure pattern may be translated across the surface of the radiation curable resin. In this method, certain regions of the same layer of radiation curable resin may be exposed to actinic radiation at times that are significantly different, for instance greater than 15 or even greater than 30 seconds apart, depending on the size of the layer of radiation curable resin being exposed. In another embodiment, the exposure occurs in multiple steps. For instance, the radiation curable resin is exposed to a first exposure and then a second exposure a short time later.

The fifth step of the first aspect of the instant claimed invention is to separate the freshly cured layer of radiation curable resin from the flexible multi-layer substrate. This step can be performed by moving the cured layer, by moving the flexible multi-layer substrate, or both. A flexible substrate allows for a "first in first out" peeling, wherein the regions of the radiation curable resin that are first irradiated are generally the first to be peeled from the substrate. Please see WO 2010/74566 to TNO, hereby incorporated by reference in its entirety as if fully set forth herein, for a description of an apparatus capable of a "first in first out" peeling.

In accordance with the above descriptions, the second aspect of the instant claimed invention is a process for additive fabrication comprising:
(1) coating a layer of radiation curable resin on a substrate, said substrate having a parallel direction and a transverse direction, and a surface tension of from 19.5 mN·m$^{-1}$ to 41 mN·m$^{-1}$, a specific essential work of fracture ($w_e$) from 12 kJ/m$^2$ to 500 kJ m$^2$ in both the parallel direction and the transverse direction, a tensile modulus at the operating temperature of the additive fabrication process above 0.2 GPa and less than 6 GPa in the parallel direction, and a yield stress above 20 MPa and less than 150 MPa in the parallel direction;
(2) contacting the layer of radiation curable resin with a previously cured layer;
(3) exposing the layer of radiation curable resin to actinic radiation, provided by a source of actinic radiation, thereby forming a cured layer which adheres to the previously cured layer;
(4) separating the cured layer and the substrate; and
(5) repeating steps 1-4 a sufficient number of times in order to build up a three-dimensional object.

The third aspect of the instant claimed invention is an apparatus for additive fabrication comprising:
(1) a flexible multi-layer substrate comprising a transport layer and a structural layer, the transport layer comprising a polyolefin or a fluoropolymer, and the structural layer comprising a semi-crystalline thermoplastic polymer;
(2) an applicator adapted to apply a layer of radiation curable resin to the transport layer of the flexible multi-layer substrate;
(3) a source of actinic radiation arranged to deliver actinic radiation to the radiation curable resin through the flexible multi-layer substrate; and
(4) a platform capable of supporting a three-dimensional object.

The first element of the third aspect of the instant claimed invention is a flexible multi-layer substrate comprising a transport layer, the transport layer comprising a polyolefin or a fluoropolymer, and a structural layer, the structural layer comprising a semi-crystalline thermoplastic polymer. All of the various and combinable embodiments discussed in describing the substrates of the first aspect of the instant claimed invention may be applied in the apparatus of the second aspect of the instant claimed invention.

The second element of the third aspect of the instant claimed invention is an applicator adapted to apply a layer of radiation curable resin to the transport layer of the flexible multi-layer substrate. The applicator can be any appropriate device for applying the radiation curable resin to the substrate, such as, depending on the nature of the radiation curable resin, a gravure roller (meyer bar), a nozzle, an ink-jet device, or a sprayer.

The third element of the third aspect of the instant claimed invention is a source of actinic radiation arranged to deliver actinic radiation to the radiation curable resin through the flexible multi-layer substrate. The actinic radiation may come from any suitable source, for instance a laser, lamp, LED, or laser diode. For photocurable radiation curable resins, any appropriate emitting wavelength of light that sufficiently overlaps with the absorbance spectrum of the photoinitiators in the radiation curable resin is suitable. Preferably the wavelength of light is from 300 to 475 nm, preferably 340 to 400 nm, more preferably 350 to 375 nm, more preferably about 365 nm. In an embodiment, the actinic radiation source is an LED or array of LEDs. In other embodiments, the actinic radiation source comprises a DMD. In an embodiment, the actinic radiation source comprises a micro-shutter arrangement. In another embodiment, the actinic radiation source comprises a laser diode or array of laser diodes.

The fourth element of the third aspect of the instant claimed invention is a platform capable of supporting a three-dimensional object. In an embodiment, the platform comprises a build pad. In another embodiment, the platform is vertically moveable. In another embodiment, the platform comprises a glass plate.

The third aspect of the instant claimed invention may also comprise other elements. For instance, in an embodiment, the apparatus further comprises a substrate tensioning device arranged to apply tension to the flexible multi-layer substrate. In an embodiment, the substrate tensioning device may comprise clamps to secure the substrate. In another embodiment, the substrate tensioning device comprises a clamp on a first end of the substrate to secure the first end of the substrate and weights supported from the opposite end of the substrate. In another embodiment, the substrate tensioning device is arranged to supply tension to the flexible multi-layer substrate at more than two edges of the substrate. In an embodiment, the substrate is kept under a static tension of 0.1-5 MPa. In another embodiment, the flexible multi-layer substrate is held under a continuous tension applied at opposite ends of the substrate of from about 5 N/m to about 50 N/m.

In an embodiment, the substrate may comprise various types of substrates joined together. For instance, a first type of multi-layer substrate may be exposed in the build area and thus subject to repeated cycles of curing of the radiation curable resin and separating of the freshly cured layer. A second type of substrate may be joined to the multi-layer substrate, said second type of substrate present outside of the build area. This second type of substrate may, for instance, be in contact with the substrate tensioning device of certain embodiments. In an embodiment, the substrate comprises a multi-layer substrate, comprising a transport layer and a structural layer, joined to a second substrate, comprising a structural layer. The structural layer may be the same as in the multi-layer substrate or different.

In further embodiments, the apparatus of the third aspect of the instant claimed invention may also comprise an enclosure. The enclosure is designed to substantially prevent actinic radiation from sources that are not the source of actinic radiation from reaching the radiation curable resin.

In a further embodiment, the apparatus comprises a reservoir of radiation curable resin connected to the applicator, the applicator arranged to coat the substrate using radiation curable resin that may be contained in the reservoir. In an embodiment, the reservoir is moveable along with the applicator across the length of the substrate.

In a further embodiment, the apparatus comprises guide elements. The guide elements are arranged to move the radiation curable resin coated on the substrate into and out of contact with the platform and/or a previously cured layer of radiation curable resin by moving the substrate.

In another embodiment, the apparatus comprises a heating element capable of heating the radiation curable resin. The heating element may be arranged in a variety of ways. Preferably, the heating element is arranged to heat the air contained inside an enclosure around the apparatus. In an embodiment, the heating element circulates the air inside an enclosure around the apparatus. In a further embodiment, the heating element is arranged adjacent to the flexible multi-layer substrate to heat the radiation curable resin that is coated on the flexible multi-layer substrate. In a further embodiment, the applicator itself is heated. In still a further embodiment, the heating element is arranged to heat the radiation curable resin contained in a reservoir.

It is the intent of the inventors to fully disclose all of the possible combinations of the individual embodiments described above to the extent of the skill of one of ordinary skill in the art unless explicitly stated, otherwise contradicted by context, or incapable of combination.

The following examples further illustrate embodiments of the invention but, of course, should not be construed as in any way limiting its scope.

EXAMPLES

For the examples that utilize a radiation curable resin, a hybrid (containing both free-radically and cationically polymerizable components) radiation curable resin that allows for acceptable performance in substrate based systems was developed. The acceptable performance is demonstrated by, for example, an acceptable amount of adhesion to the substrate when forming a freshly cured layer, acceptable speed of forming a freshly cured layer, and acceptable green strength buildup of the three-dimensional object. This radiation curable resin is liquid at room temperature. This radiation curable resin contains 38.895 wt % of cationically polymerizable components. The formula of the radiation curable resin, with the amount of each component in weight % of the entire composition is detailed in Table 1. The radiation curable resin specified in Table 1 is referred to as the test resin throughout this section.

TABLE 1

| Trade Name | Function in Formula | Chemical Descriptor | Supplier | Amount |
|---|---|---|---|---|
| Celloxide 2021P | Cationically Polymerizable Component | 3,4-Epoxycyclohexylmethyl-3',4'-epoxycyclohexanecarboxylate | Daicel Chemical | 38.895 |
| Chivacure ® BMS | Photosensitizer | 4-Benzoyl-4'-methyldiphenyl thioether | Chitec | 1.5 |
| DG-0049 | Pigment | Violet pigment in monomer | DSM | 0.5 |
| Ebecryl ® 3700 | Free-radically Polymerizable Component | Bisphenol A diglycidyl ether diacrylate | Cytec | 25 |
| CD 406 | Free-radically Polymerizable Component | Cyclohexane dimethanol diacrylate | Sartomer | 8 |
| Irgacure ® 184 | Free-radical Photoinitiator | α-Hydroxycyclohexyl phenyl ketone | BASF | 4 |
| Irgacure ® 819 | Free-radical Photoinitiator | Bis(2,4,6-trimethylbenzoyl) phenylphosphine oxide | BASF | 0.1 |
| PVP | Acid scavenger | poly vinyl pyrrolidone | Sigma Aldrich | 0.005 |
| Rhodorsil ® PI 2074 | Cationic Photoinitiator | 4-Isopropylphenyl)(4-methylphenyl)iodonium tetrakis(pentafluorophenyl)borate | Rhodia | 2 |
| Terathane ® 1000 | Chain Transfer Agent | polyTHF polyol | Invista | 20 |
| Total | | | | 100 |

Information on the various substrates used and referred to throughout these examples can be found in Table 2.

TABLE 2

| Substrate Name | Substrate Description | Trade Name | Manufacturer/ Supplier |
|---|---|---|---|
| PA6 | PA6 (polyamide 6) | PA6 Cast Nylon Film | MF Folien |
| 20PE/80PA6 | PA6/PE laminate (PA6 80 μm thick)/ (PE 20 μm thick) | PA6 Cast Nylon Film PE TK 550.05 EK | MF Folien Nordenia |
| 40PE/80PA6 | PA6/PE laminate (PA6 80 μm thick)/ (PE 40 μm thick) | PA6 Cast Nylon Film PE TK 550.05 EK | MF Folien Nordenia |
| 20PE/100PA6 | PA6/PE laminate (PA6 100 μm thick)/ (PE 20 μm thick) | PA6 Cast Nylon Film PE TK 550.05 EK | MF Folien Nordenia |
| 40PE/100PA6 | PA6/PE laminate (PA6 100 μm thick)/ (PE 40 μm thick) | PA6 Cast Nylon Film PE TK 550.05 EK | MF Folien Nordenia |
| PET | PET (polyethylene terephthalate) (250 μm thick) | Melinex ® 515 | SABIC Polymershapes |
| ETFE | ETFE (ethylene-tetrafluoroethylene copolymer) | Tefzel ® 500LZ | DuPont ® |
| FEP | FEP (perfluorinated ethylene-propylene) | Teflon ® | DuPont ® |
| TPX | TPX (poly(4-methylpentene-1) | TPX Opulent ™ X-88BMT4; 100 μm thick | Mitsui Chemicals |
| 50TPX/50PET | TPX/PET laminate (TPX 50 μm thick)/ (PET 50 μm thick) | TPX Opulent ™ X-88BMT4, 50 μm thick Mitsui PET, 50 μm thick | Mitsui Chemicals Mitsui Chemicals |

TABLE 2-continued

| Substrate Name | Substrate Description | Trade Name | Manufacturer/Supplier |
|---|---|---|---|
| TOPAS® COC | TOPAS® COC (cyclic olefin copolymer) | TOPAS® Tg 55° C., F07-49-1; 50 μm thick | TOPAS® Advanced Polymers |
| Si/PET | Sylgard® 184 coating on Melinex® 516 (100 μm thick) | Sylgard® 184 Silicone Elastomer Melinex® 516 | Dow Corning SABIC Polymershapes |

The 20PE/80PA6, 40PE/80PA6, 20PE/100PA6, 40PE/100PA6, 50TPX/50PET, and SiPET substrates are multi-layer substrates, whereas the PA6, PET, ETFE, FEP, TPX, and TOPAS® COC substrates are single layer substrates. The SiPET substrate is a multi-layer substrate formed via a coating process.

Dewetting

A dewetting test is performed to measure the speed at which dewetting occurs for various substrates. Test substrates are stored in a temperature-humidity control room at 25° C. and 50% relative humidity for at least 24 hours prior to testing. The test resin is stored in an oven set at a temperature between 25 and 30° C. for 24 hours before testing. The test is performed for various substrates at 25° C. ambient temperature. The test is performed in triplicate, with three different sections of each substrate subject to the dewetting test. The substrate is attached on a glass plate and then, a drawdown of the test resin is performed using a 3 mil drawdown bar—see Initial State diagram of FIG. 2. A stop watch is started immediately after the drawdown is completed and stopped once dewetting occurs.

Figure 2:
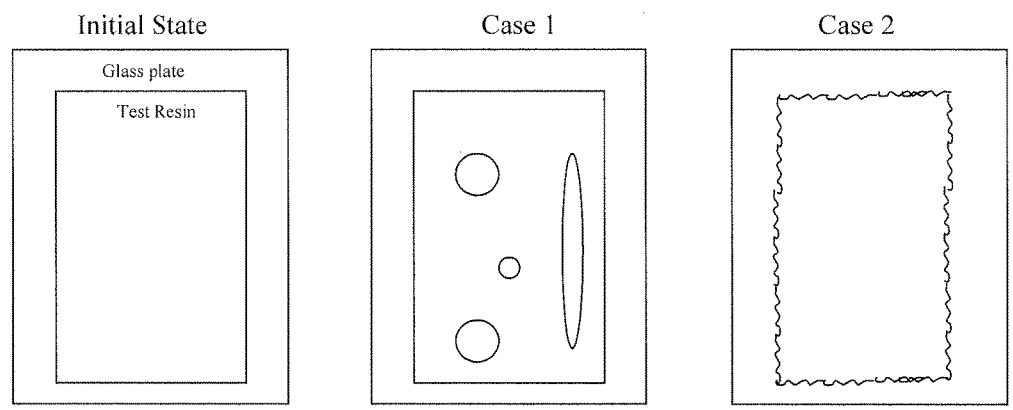
FIG. 2 is a top perspective view of resin dewetting conditions.

Dewetting is deemed to have occurred when the formation of any size and shape of droplet is visually perceptible—see Case 1 of FIG. 2. Moreover, dewetting is also deemed to have occurred if there is any visual perception of contraction of the test resin from the edge of the drawdown—see Case 2 of FIG. 2. Any combination of these two cases is also considered as dewetting.

The time until dewetting was measured for various substrates. The results are recorded in Table 3.

TABLE 3

| Substrate | 1$^{st}$ measurement | 2$^{nd}$ measurement | 3$^{rd}$ measurement | Average Dewetting Time |
|---|---|---|---|---|
| PA6 | >30 min | >30 min | >30 min | >30 min |
| PE (PE side of PA6/PE laminate) | 35 sec | 41 sec | 29 sec | 35 sec |
| PET | >30 min | >30 min | >30 min | >30 min |
| ETFE | 7 sec | 6 sec | 5 sec | 6 sec |
| FEP | 9 sec | 11 sec | 6 sec | 8.7 sec |
| TPX | 27 sec | 32 sec | 40 sec | 33 sec |
| TOPAS® COC | 9 min 25 | 7 min 50 sec | 6 min 15 sec | 7 min 50 sec |
| Sylgard® 184 | 19 sec | 26 sec | 27 sec | 24 |

It is noted that the fluorinated polymers generally have much shorter dewetting times than the polyolefins.

Adhesion Testing

Adhesion of cured resin to different substrates is evaluated. The substrate of interest is taped to a letter-sized glass plate for support and to ensure a flat working surface. A doctor blade is used to apply a uniform 100 micron layer of the test resin. Curing is achieved by passing the sample through a UV-rig equipped with a 6000 watt Fusion D-bulb at 18 m/min under nitrogen (total energy dose of 1 J/m$^2$) within 20 seconds of the layer being doctor bladed. Within a minute of exiting the UV rig, the sample is removed from the glass support and the substrate is bent. Samples are judged to have low adhesion if bending of the substrate was sufficient to cause separation of the cured resin layer from the substrate without damaging either the substrate or the cured resin layer. Samples are judged to have high adhesion if adhesive failure between the cured resin layer and substrate could not be generated by bending the substrate. Low adhesion (easy peeling) was found for the ETFE, PE, and TPX substrates. High adhesion (difficult or no peeling) was found for the PET and PA-6 substrates.

Tear Resistance

Figure 3:
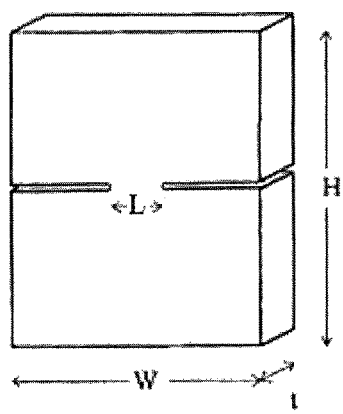
FIG. 3 is a front view of the sample geometry used in a double-edged notched tensile test.

In order to test the tear resistance of a substrate, a double-edged notched tensile test (DENT) is performed, as described in Maspoch et al., "The Essential Work of Fracture of a Thermoplastic Elastomer," Polymer Bulletin, 39, 246-255 (1997). From each substrate, triplicate samples with dimensions of 50 mm (W)×70 mm (H) and nominal ligament lengths (L) of 1, 5, 10, or 15 mm are prepared by cutting with a sharp razorblade. The geometry of the samples is shown in FIG. 3. The exact length of each ligament was measured with a travelling optical microscope equipped with a micrometer. The thickness of the substrate (t) is measured with a Heidenhain micrometer.

Each substrate is tested in two perpendicular directions, the parallel direction and the transverse direction. Tests are performed at room temperature on a tensile machine (Zwick Z010 with Type KAF-TC 10 kN load cell) at a constant crosshead speed of 50 mm/min until failure of the specimen. The loads vs. displacement curves were recorded and the total energy was calculated via numerical integration of the load-displacement curve.

The total energy is then normalized by the cross-sectional area of the ligament (L×t) and is plotted against ligament length (L). Microsoft™ Excel is used to determine a linear fit of the data to calculate the Y-intercept ($w_e$) and the slope ($w_p\beta$). The specific essential work of fracture, $w_e$, is the Y-intercept, is the energy associated with moving a crack forward. The specific non-essential work of fracture multiplied by the dimensionless factor $\beta$, $w_p\beta$, is the slope and is associated with material yielding.

The results of the test for various substrates can be found in Table 4.

TABLE 4

| Substrate | Parallel Direction | | | Transverse Direction | | |
|---|---|---|---|---|---|---|
| | $w_e$ [kJ/m$^2$] | $w_p\beta$ [mJ/mm$^3$] | $R^2$ [Best Fit] | $w_e$ [kJ/m$^2$] | $w_p\beta$ [mJ/mm$^3$] | $R^2$ [Best Fit] |
| PA6 | 39.7 | 12.8 | 0.992 | 32.9 | 12.3 | 0.995 |
| TPX | 9.8 | 1.3 | 0.973 | 8.4 | 0.4 | 0.628 |
| 50TPX/50PET | 18.3 | 7.5 | 0.985 | 11.4 | 7.0 | 0.994 |
| ETFE | 31.6 | 12.5 | 0.998 | 29.0 | 13.1 | 0.993 |
| 20PE/80PA6 | 40.4 | 11.6 | 0.991 | 29.9 | 9.8 | 0.991 |
| 40PE/80PA6 | 61.1 | 10.2 | 0.987 | 31.7 | 9.1 | 0.989 |
| 20PE/100PA6 | 43.0 | 11.9 | 0.996 | 29.5 | 10.7 | 0.993 |
| 40PE/100PA6 | 51.8 | 8.4 | 0.984 | 32.8 | 12.0 | 0.993 |

Essential work of fracture is much improved in the flexible multi-layer substrates comprising a polyolefin transport layer and a semi-crystalline thermoplastic polymer structural layer over the single layer substrates. It is noted that the 50TPX/50PET is the only multi-layer substrate tested that possesses an essential work of fracture in the transverse direction of less than 12 kJ/m$^2$ and a $w_p\beta$ of less than 8 mJ/mm$^3$ in both the parallel and transverse directions.

Apparatus Testing

Several substrates are additionally tested on an apparatus capable of performing a substrate-based additive manufacturing process. Please see FIG. 4 for a description of the test apparatus. Approximately 3 meters of a given substrate (1) is positioned on the apparatus. A moveable guiding stage (2) is positioned between a first end and a second end of the substrate. The guiding stage contains rollers 3 and 4 with diameters of 50 mm, rollers 5 and 6 with diameters of 12 mm, and rollers 7 and 8 with diameters of 12 mm. Rollers 7 and 8 are rollers possessing reversible curvature as in PCT/NL2011/050734, which is hereby incorporated by reference in its entirety as if fully set forth herein, and reverse curvature in accordance with the movement direction (P, Q). The substrate is pulled taught. The substrate is secured by clamping the first end of the substrate and by either clamping the substrate at the second end of the substrate or by suspending weights from the second end of the substrate. In either case, the amount of clamping resistance or suspended weight was 20 kg. The ends of the substrate are substantially immovable during operation of the apparatus.

Figure 4:
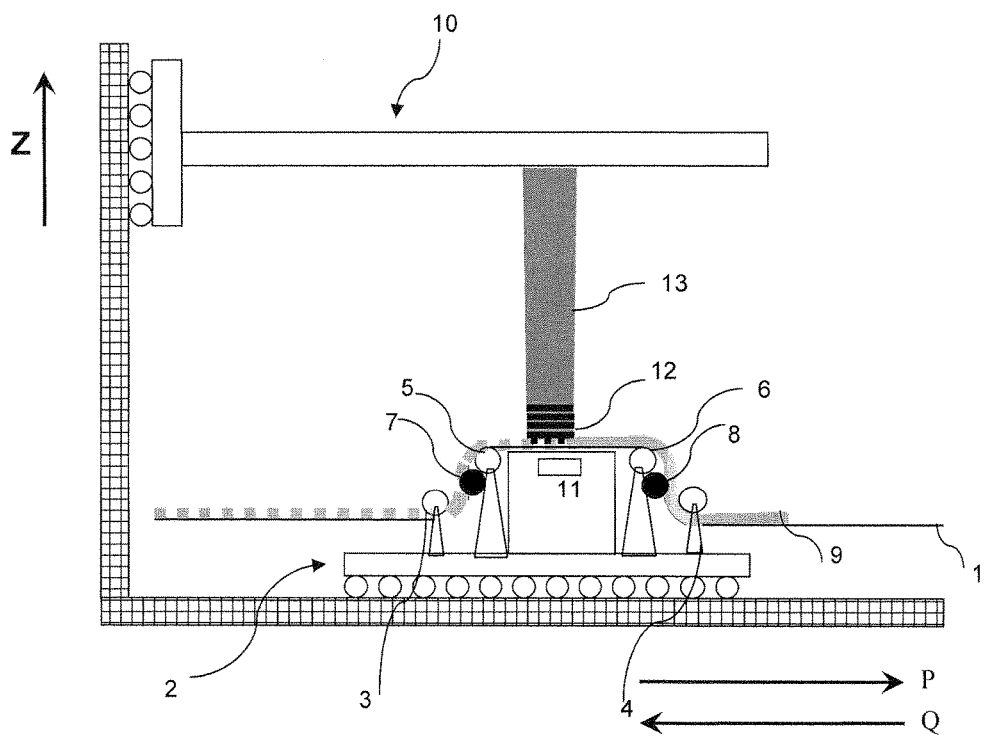
FIG. 4 is a partial schematic side view of a substrate-based additive fabrication process.

Rollers 3 and 4 are knurled rollers (also known as gravure rollers or meyer bars) which are in contact with an amount of radiation curable resin held in reservoirs that are moveable with each roller. Rollers 3 and 4 deposit approximately a 50 micron layer of radiation curable resin (9) on the substrate (1) as the moveable guiding stage (2) is translated. The guiding stage (2) is translated at 20 mm/s. A platform (10) is moveable in the z-direction. The platform (10) is moved to a distance of one layer thickness, which is necessarily less than the height of the deposited layer of radiation curable resin, from the substrate. As the guiding stage (2) is translated in a first direction (P), the lead roller (4) deposits a layer of radiation curable resin (9) on the substrate (1). As the guiding stage is translated, the source of radiation (11) is activated to supply light with a peak wavelength of approximately 365 nm to the radiation curable resin to thereby harden the resin. The hardened resin is separate from the substrate (1) by the movement of the guiding stage (2) and adheres to either the platform (10) or, as shown in FIG. 4, to a previously cured layer (12) of the object being formed (13). The process is performed in reverse by translating the guiding stage (2) in the reverse direction and repeated to build up the object (13) layer-by-layer. During the process the substrate is pulled taught such that the substrate is in sliding contact with the surface of the source or radiation (11).

For each substrate listed below the apparatus was operated at a translation speed of 20 mm/s, an ambient temperature of 32° C., and a humidity of 30-40% RH. The results are shown in Table 5 below.

TABLE 5

| Substrate | Transport layer | Structural layer | Results | Comments |
|---|---|---|---|---|
| 20PE/100PA6 | PE | PA6 | Success | Adequate toughness and resin release |
| 20PE/100PA6 | PA6 | PE | Foil adhesion to curing resin | unable to separate PA6 transport layer from curing resin |
| 50TPX/50PET | TPX | PET | Good release from curing resin, but exhibited tearing during building | Inadequate toughness |
| TPX | | | Good release from curing resin, but exhibited tearing during building | Inadequate toughness |

Although the 50TPX/50PET substrate exhibited inadequate toughness on this specific test, due to its specific work of fracture ($w_e$) and $w_p\beta$, the 50 TPX/50PET substrate is expected to be suitably employed in less strenuous substrate-based additive fabrication processes. Such as, for example, processes requiring less clamping force and processes wherein there is less contact between the surface of the source of radiation and the substrate. However, multi-layer substrates possessing a specific work of fracture from 12 kJ/m$^2$ to 500 kJ/m$^2$, a $w_p\beta$ of from 8 mJ/mm$^3$ to 500 mJ/mm$^3$, or both, in each direction of support are preferred.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While certain embodiments detail certain optional features of the invention, the description is meant to encompass and specifically disclose all combinations of these features unless specifically indicated otherwise or physically impossible. While the invention has been described in detail and with reference to specific embodiments thereof, it will be apparent to one of ordinary skill in the art that various changes and modifications can be made therein without departing from the spirit and scope of the claimed invention.

What is claimed is:

1. A process for additive fabrication comprising:
   (1) providing a flexible multi-layer substrate comprising a transport layer and a structural layer, the transport layer comprising a polyolefin or a fluoropolymer, and the structural layer comprising a semi-crystalline thermoplastic polymer;
   (2) coating a layer of radiation curable resin on the transport layer of the flexible multilayer substrate;
   (3) contacting the layer of radiation curable resin with a previously cured layer;
   (4) exposing the layer of radiation curable resin to actinic radiation, provided by a source of actinic radiation, thereby forming a cured layer which adheres to the previously cured layer;
   (5) separating the cured layer and the flexible multi-layer substrate; and
   (6) repeating steps 2-5 a sufficient number of times in order to build up a three-dimensional object;
   wherein the flexible multi-layer substrate has either a specific essetial work of fracture greater than 12 kJ/m$^2$ and less than 500 kJ/m$^2$, a $w_p\beta$ of greater than 8 mJ/mm$^3$ and less than 500 mJ/mm$^3$, or both, in each direction of support.

2. The process of claim 1 wherein the flexible multi-layer substrate possesses a parallel direction and a transverse direction and the flexible multi-layer substrate has either a specific essential work of fracture of greater than 12 kJ/m$^2$ and less than 500 kJ/m$^2$, a $w_p\beta$ of greater than 8 mJ/mm$^3$ and less than 500 mJ/mm$^3$, or both, in both the parallel direction and the transverse direction.

3. The process of claim 1 wherein the radiation curable resin comprises from 30 to 85 wt. % of cationically curable compounds, and from 10 to 60 wt. % of free-radically curable compounds.

4. The process of claim 1 wherein the transport layer possesses a surface, said surface being secured to the structural layer, wherein at least a portion of said surface has been subject to a corona treatment.

5. The process of claim 1 wherein the flexible multi-layer substrate has a thickness of from 20 to 250 microns.

6. The process of claim 1 wherein the actinic radiation is UV radiation in the range from 320 to 400 nm.

7. The process of claim 1 wherein the transport layer comprises a polyolefin.

8. The process of claim 1 wherein the transport layer is a polyethylene or polymethylpentene.

9. The process of claim 1 wherein the structural layer is a thermoplastic polyamide or thermoplastic polyester.

10. The process of claim 1 wherein the radiation curable resin possesses a temperature from 25 degrees C. to 45 degrees C. at the time of exposure to the actinic radiation.

11. The process of claim 1 wherein the transport layer has a matte surface finish.

12. The process of claim 1 wherein flexible multi-layer substrate is a two-layer substrate created by a lamination process, the transport layer and structural layer being secured to one another with a polyurethane adhesive.

13. A process for additive fabrication comprising:
   (1) coating a layer of radiation curable resin on a substrate, said substrate having a parallel direction and a transverse direction, and a surface tension of from 19.5 mN·m$^{-1}$ to 41 nN·m$^{-1}$, a specific essential work of fracture from 12 kJ/m$^2$ to 500 kJ/m$^2$ in both the parallel direction and the transverse direction, a tensile modulus at the operating temperature of the additive fabrication process above 0.2 GPa and less than 6 GPa in the parallel direction, and a yield stress above 20 MPa and less than 150 MPa in the parallel direction;
   (2) contacting the layer of radiation curable resin with a previously cured layer;
   (3) exposing the layer of radiation curable resin to actinic radiation, provided by a source of actinic radiation, thereby forming a cured layer which adheres to the previously cured layer;
   (4) separating the cured layer and the substrate; and
   (5) repeating steps 1-4 a sufficient number of times in order to build up a three-dimensional object.

14. The process of claim 13 wherein the substrate is a flexible multi-layer substrate comprising a transport layer and a structural layer and the layer of radiation curable resin is coated on the transport layer of the multi-layer substrate.

15. The process of claim 13 wherein the actinic radiation is light, said light possessing a transmission spectrum, and wherein the substrate has a transmission of 80% of the light at the transmission spectrum.

16. The process of claim 13 wherein the substrate possesses a $T_g$ of from 30° C. to about 200° C.

17. The process of claim 15 wherein the substrate possesses a $T_g$ of from 30° C. to about 65° C.

18. The process of claim 13 wherein the substrate possesses a $w_p\beta$ of greater than 8 mJ/mm$^3$ in both the parallel and transverse direction.

19. The process of claim 13 Wherein the operating temperature of the additive fabrication process is from 25° C. to 45° C.

* * * * *